United States Patent [19]

Ghitea, Jr.

[11] Patent Number: 5,775,406
[45] Date of Patent: Jul. 7, 1998

[54] VENTILATION MESSAGE DISPLAY SYSTEM AND METHOD FOR A VEHICLE

[75] Inventor: Nicolae Ghitea, Jr., Tigard, Oreg.

[73] Assignee: Freightliner Corporation, Portland, Oreg.

[21] Appl. No.: 674,134

[22] Filed: Jul. 1, 1996

[51] Int. Cl.$^6$ .................. G05D 23/00; F24F 7/06
[52] U.S. Cl. .............. 165/11.1; 165/248; 236/94; 454/229
[58] Field of Search .................. 165/11.1, 249, 165/248; 236/94, 49.3; 454/229, 75, 257

[56] References Cited

U.S. PATENT DOCUMENTS

| | | | |
|---|---|---|---|
| 3,418,914 | 12/1968 | Finkin | 454/75 |
| 4,258,421 | 3/1981 | Juhasz et al. | 364/424 |
| 5,303,163 | 4/1994 | Ebaugh et al. | 364/550 |

FOREIGN PATENT DOCUMENTS

| | | | |
|---|---|---|---|
| 40424541 | 9/1992 | Japan | 454/229 |

OTHER PUBLICATIONS

*Owner's Manual Caterpillar Driver Information Display*, Caterpillar, Feb. 1995.
*ProDriver™ User Manual*, Detroit Diesel Corporation, Mar., 1994.
*Model 2005AD High Level Pre–Amp OEM Carbon Dioxide Monitor*, VTI Valtronics. Revised Jun. 20, 1996. pp. 1–3; Revised Jun. 11, 1996, pp. 4–6, & 8.
*CELECT RoadRelay™ User's Guide*, Cummins Cadec, 1993.

*Primary Examiner*—William E. Wayner
*Attorney, Agent, or Firm*—Klarquist Sparkman Campbell Leigh & Whinston LLP

[57] ABSTRACT

A ventilation display system determines when a ventilation system has remained in recirculation mode for a predefined time, and in response generates a stale air alert message inside the cab of a truck. The system can generate messages alerting the driver that the HVAC system has switched into recirculation mode, and alerting the driver that the recirculation mode has remained active for the predefined time. When equipped with a $CO_2$ sensor, the system can generate air quality messages based on either the status of the recirculation mode or the level of $CO_2$ in the cab of the truck or both.

12 Claims, 2 Drawing Sheets

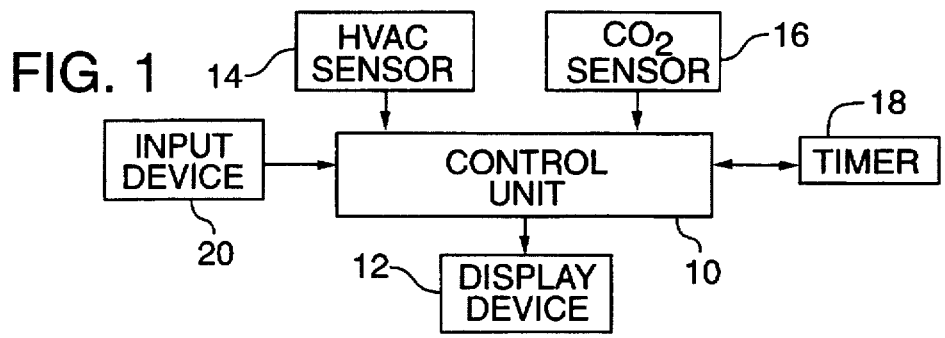
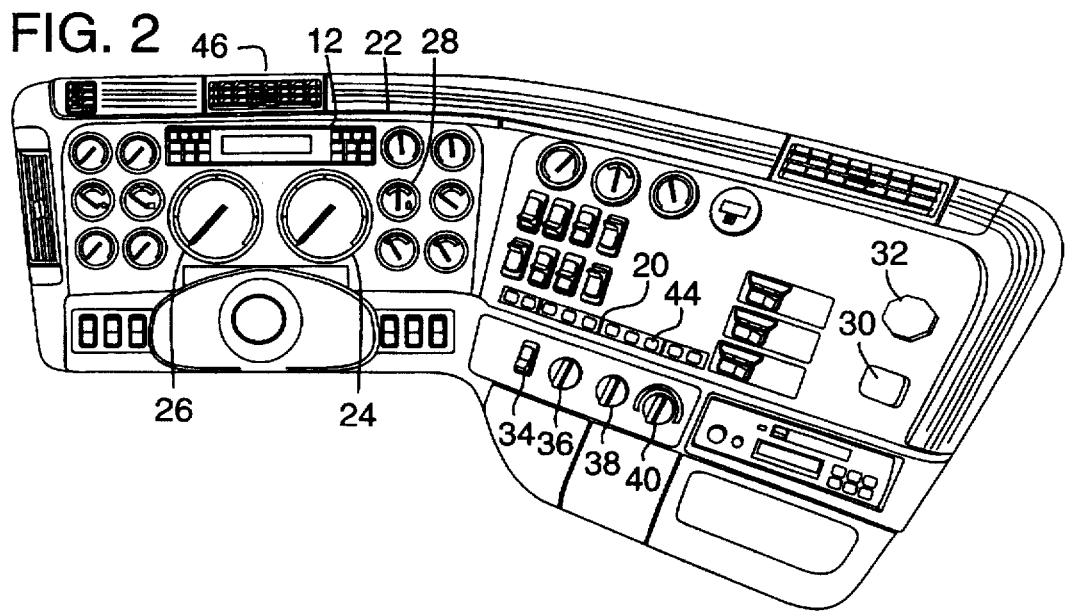
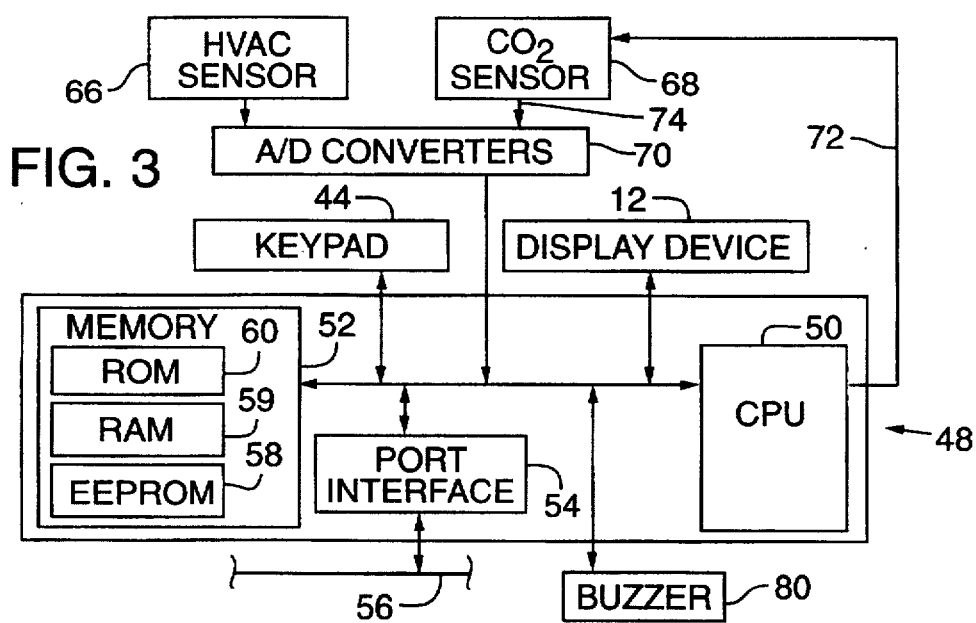

VENTILATION MESSAGE DISPLAY SYSTEM AND METHOD FOR A VEHICLE

TECHNICAL FIELD

The invention relates to a message display system for vehicles and more specifically relates to a message system for generating messages regarding the air quality in a vehicle.

BACKGROUND OF THE INVENTION

The heating, ventilation, and air conditioning (HVAC) systems in many of today's cars and trucks commonly have a recirculation mode where air is recirculated within the vehicle. When switched into this mode, the HVAC system recirculates the air in the vehicle rather than drawing "fresh" air into it. If left on too long, carbon dioxide can build up inside the vehicle and degrade the air quality. As stale air builds up, the driver can become drowsy due to the lack of fresh air.

Despite the potential hazard that a build up of $CO_2$ in the vehicle creates, the inventor knows of no vehicles that have a message system to warn the driver of this hazard. There is a need, therefore, for a warning system to alert the driver when he or she has left the HVAC system in recirculation mode too long.

SUMMARY OF THE INVENTION

The invention provides a message display system and related methods for displaying stale air alert messages in response to detecting poor air quality conditions in a vehicle. The message display system monitors the control circuitry of the ventilation system to determine when it has switched to recirculation mode. The system tracks the elapsed time while the ventilation system is in recirculation mode and generates a warning message if the ventilation system remains in recirculation mode for a predetermined time.

The system can optionally include a $CO_2$ sensor to monitor $CO_2$ levels in the vehicle. When equipped with the $CO_2$ sensor, the system can generate air quality messages when either: 1) the system determines that the $CO_2$ level exceeds a predefined threshold, or 2) the system determines that the recirculation mode has remained active for a predefined time period. The system can monitor both conditions and display an alert message, so long as either of the conditions are satisfied. Alternatively, the system can monitor the recirculation mode as a supplement to monitoring $CO_2$ level in the vehicle when it detects that the $CO_2$ sensor is not operating properly.

Further features and advantages of the invention will become apparent with reference to the following detailed description and accompanying drawings.

BRIEF DESCRIPTION OF THE DRAWINGS

FIG. 1 is a functional block diagram illustrating one implementation of a ventilation message display system.

FIG. 2 is a perspective view illustrating the layout of instruments and controls on a dash incorporating one embodiment of the invention.

FIG. 3 is a block diagram illustrating the instrumentation control unit (ICU) in an embodiment of the invention.

DETAILED DESCRIPTION

Figure 4:
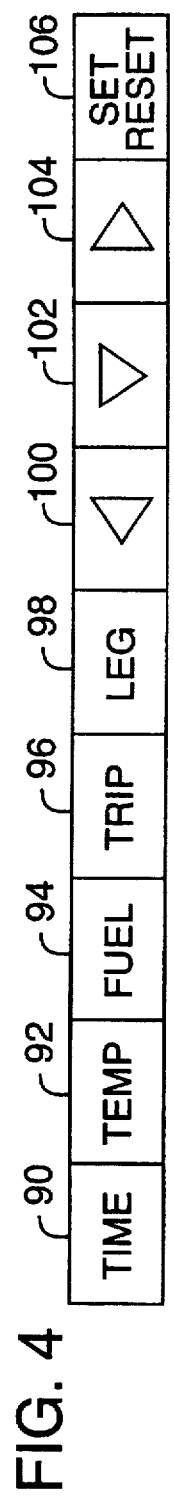
FIG. 4 is a diagram of one implementation of an input device of the ICU shown in FIG. 2.

FIG. 1 is a functional block diagram illustrating one implementation of a ventilation message system in a vehicle. In this implementation, a control unit 10 monitors the HVAC system through an HVAC sensor 14 and generates the display of a warning message or messages on a display device 12 when it detects that the HVAC system has remained in recirculation mode for a predetermined time.

The message system can also include a $CO_2$ sensor 16 to detect when the $CO_2$ level in the vehicle reaches a predefined level. When equipped with a $CO_2$ sensor, the message system monitors the level of $CO_2$ in the vehicle, and in addition, keeps track of how long the HVAC system is in the recirculation mode. The system can generate a warning message alerting the driver that the air is stale based either on the $CO_2$ level in the vehicle, or the length of time that the HVAC system remains in recirculation mode or both.

The control unit in FIG. 1 monitors the state of the recirculation mode through the HVAC sensor 16. The HVAC sensor is a control circuit used to monitor the switch activity of a recirculation mode control in the HVAC system. For example in one implementation, it is a control circuit coupled to a recirculation switch in the HVAC system, and it generates a signal indicating that the HVAC system is in recirculation mode. The control unit monitors the state of the recirculation mode by monitoring the signal from the HVAC sensor and keeps track of elapsed time when the recirculation mode is active.

The message system can optionally include a timer 18 to keep track of elapsed time when the HVAC is in recirculation mode. The timer is not necessary, of course, if the control unit is implemented using a processor that provides timer services.

The $CO_2$ sensor shown in FIG. 1 determines the $CO_2$ level in the vehicle and generates a signal representing the $CO_2$ level or representing that the $CO_2$ level has exceeded a threshold. In the first case, the control unit computes when the $CO_2$ level has exceeded a predefined threshold, while in the second case, the control unit detects that the $CO_2$ has exceeded a threshold from the signal generated by the sensor.

The message system can optionally include an input device 20 to enable the user to enter input commands to the control unit and control its display. Preferably located at the dash of the truck, the input device 20 enables the driver to supply inputs to the control unit and control the display. For example, the driver can use the input device to clear the message display, or the driver or other operator can use the input device to configure the control unit to control how it displays messages.

While the control unit can be located in a variety of places in the truck, it is preferably located in the dash. The display and input devices coupled to the control unit are also preferably located at the dash so that the driver may easily view the display and access the input device.

FIG. 2 is a diagram illustrating the position of one form of a display 12 and an input device 20 among the instruments and controls on a dash 22 in one implementation of ventilation message system for a truck. The dash 22 shown in FIG. 2 includes a number of gauges, including for example, an analog speedometer 24 and tachometer 26, a fuel gauge 28, etc. Instruments located at the dash may include a parking brake switch 30, air suspension switch 32, HVAC controls 34-40, etc.

The HVAC controls include a recirculation mode switch 34, fan speed control 36, HVAC master switch 38, and air temperature control 40. The recirculation mode switch 34 enables a user to select a recirculation mode in which air is recirculated in the vehicle, by a fan (not shown) and a fresh air mode in which fresh air is drawn from outside the vehicle. The fan speed control is a conventional control used to control the fans in the HVAC system. The HVAC master switch is a conventional control enabling one to select an operating mode for the HVAC system including air conditioning, defrost, vent, etc.

The dash also includes the display 12 for a control unit of a message system. The control unit is referred to as the instrumentation control unit (ICU) in this implementation. The user interface of the instrumentation control unit includes a message display panel 46 and keypad 44, both located on the dash. The keypad 44 is one way to implement the input device 20 shown in FIG. 1. A variety of conventional input devices can be used in the alternative.

The display device 12 presents a two-line display at panel 46, sometimes referred to as the "message center." In the implementation shown here, the display panel 46 comprises a two by 20 vacuum fluorescent (VF) display. The display device can be implemented using other conventional display technology such as a liquid crystal display (LCD), light emitting diode (LED) or other display device. The illustrated input device 20 in the user interface is a keypad including both dedicated and general purpose function keys. Alternative implementations using conventional input device technology are also possible.

An instrumentation control unit (ICU) in the vehicle controls the display of messages on the display screen of the display panel 46 shown in FIG. 2. It is responsible for monitoring operating conditions in the truck including the status of the recirculation mode of the HVAC system.

FIG. 3 is a block diagram illustrating the ICU 48 in one implementation of the invention. The ICU is typically positioned in the truck cab for easy access, and preferably at the dash of the truck.

The instrumentation control unit 48 includes a CPU 50, memory 52 and a port interface 54 for connecting the unit to a shared communication link 56.

The memory 52 includes programmable ROM (EEPROM) 58, permanent ROM 60 and volatile RAM 59. The routines for controlling the ICU are stored in ROM 60, while configurable data such as a configuration file is stored in the EEPROM 58. The memory 52 also includes a form of temporary memory such as RAM 59 for temporary storage of program instructions and data.

In one specific implementation, the ICU has two CPUs and its memory includes EEPROM, ROM, and RAM. The CPUs are 68HC11 microprocessors from Motorola Corporation. A first CPU controls the operation of the message display system, while a second CPU controls instrumentation integrated with the ICU. Since the second CPU is not used for the message display system, it is not necessary to implement the invention. This specific ICU has 8 KB of external EEPROM, 128K of ROM and 2K of RAM. The CPUs internal memory comprises 256 Bytes of RAM and 512 bytes of EEPROM. This is only one specific implementation of the ICU. A variety of conventional processors and memory systems can be used to implement the functionality of the instrumentation control unit.

The ICU 48 can communicate with other electronic devices connected to a shared data link 56 through the port interface 54. The port interface, in this implementation, is an interface to a data link comprised of a twisted pair cable. This particular data link is designed according to SAE J1708, a standard for serial data communication between microcomputer systems in heavy duty vehicle applications.

Electronic devices connected on the data link, such as the ICU 48, communicate with each other according to protocols defined in SAE J1708 and SAE J1587. The SAE J1587 standard is entitled "Joint SAE/TMC Electronic Data Interchange Between Microcomputer Systems and Heavy Duty Vehicle Applications." This standard defines the format of data and messages communicated among microprocessors connected to a shared data link, and is specifically adapted for use with SAE J1708.

A user can configure the ICU 48 by setting parameters in a configuration file and downloading the file to the ICU via the port interface 54. The configuration file includes a number of parameters that control the operation of the ICU. One type of parameter is a display format parameter used to control the message display. By setting the value of a display parameter to predefined values, the user can select among predefined display formats such as display message once for 7 seconds, or repeat this message every 254 seconds. The configuration file includes additional parameters used to set the conditions that trigger a warning message. For example, the activating time for a "stale air" warning message can be set by setting a value in the configuration file equal to the activating time, in minutes, for example, or it may be fixed at predetermined time, such as 20 minutes.

The ICU 48 also includes an input device such as the dash mounted keypad 44 and a display device 12. A specific of the keypad is shown in greater detail in FIG. 4.

The display device 12 in FIG. 3 corresponds to the display device 46 described above in connection with FIG. 2. It should be noted that for a lower cost implementation, an indicator light with a message indicating that the air in the cabin is stale could also be used. This indicator light would be illuminated in the event that the ICU detected stale air conditions in the cabin.

The ICU 48 (FIG. 3) is connected to an HVAC sensor 66 through analog to digital converter (A/D) 70. In this implementation the HVAC sensor 66 is a switch that electrically connects an input of the A/D converter with a power supply. When a user selects the recirculation mode via the recirculation switch 34 (shown in FIG. 2), the HVAC sensor 66 (FIG. 3) supplies a signal to the input of the A/D converter 70 indicating that the recirculation mode is active. The ICU is programmed to respond to this signal to display a message acknowledging that the HVAC system is in recirculation mode and to generate a warning message when left in this mode too long. In this implementation, the ICU polls the input to check whether the HVAC signal is active. In the alternative, the ICU can be programmed to respond to interrupts raised when the HVAC signal is activated and deactivated.

As shown in FIG. 3, the ICU 48 can be coupled to a $CO_2$ sensor 68 to monitor the $CO_2$ level in the cab of the truck. The $CO_2$ sensor operates in response to control signals 72 from the CPU 50 in the ICU 48 and provides output signals 74 from which the level of $CO_2$ can be derived. A $CO_2$ sensor suitable for this application is Model 2005AD High Level Pre-Amp OEM Carbon dioxide Monitor from Valtronics of Valley Springs, Calif. This $CO_2$ sensor passes an infrared beam through a gas cell to determine the $CO_2$ concentration in the cell. The CPU provides a logic level high signal to the sensor for a predetermined period (about 500 ms) to turn on an infrared beam, and then provides a logic low signal for the predetermined time to turn off the infrared beam. The output signal is an analog waveform oscillating between a high peak (after the infrared light is on for the predetermined time) to a low peak (after the infrared beam is off for the predetermined time). The difference between the high and low voltages is indicative of the $CO_2$ level in the gas cell, where the greatest difference means approximately zero percent $CO_2$ and the smallest difference means the full scale percent $CO_2$ in the cell.

The CPU 50 samples the waveform through the A/D converters 70 at a first interval when the waveform is at or near its high peak and a second interval when the waveform is at or near its low peak and averages the samples to eliminated noise. The difference between the average at the high and low peaks is a measure of how much $CO_2$ is in the gas cell, which is located in the cabin. The $CO_2$ sensor should be calibrated for temperature. This sensor provides a temperature signal from which the CPU computes a temperature compensation factor (e.g. 0.2% per degree C for every degree change from zero calibration). The CPU calibrates the sensor by providing a control signal that adjusts the sensor through control signal path 72.

The CPU compares the $CO_2$ level computed using the method above with a predetermined threshold value stored in the ICU to determine whether it should generate a warning message. If the $CO_2$ level exceeds the predetermined threshold, it generates a warning message.

The ICU 48 shown in FIG. 3 may also include a buzzer 80 as an auxiliary warning device used to produce an audio alarm to supplement an alert on the display. For example, the buzzer provides an audio alert for warning conditions such as "stale air, stop recirculation." In this implementation, the buzzer is integrated into the ICU 48. However, a buzzer or other audio warning device can be implemented as a discrete device to the ICU as well.

In this implementation, the CPU 50 can control the output of the buzzer to produce different types of audio alarms based on the nature of the warning. For example, the ICU shown in FIG. 3 distinguishes higher priority messages from other messages by playing a continuous tone or a continuous series of pulses. For lower priority messages, the ICU plays a limited number of pulsed tones. The CPU in the ICU issues control signals to the buzzer to cause it to play a continuous tone, a continuous series of pulsed tones (a continuous series of "beeps"), or a pulsed response (e.g., a limited number of "beeps"). The ICU can be configured to play these audio warnings along with display messages by setting corresponding parameters in its configuration file. The value of the parameter can specify that an audio warning is to be played along with visual message and can also specify the type of audio alarm (e.g., continuous tone, continuous series of pulses, or limited number of pulsed tones).

The particular ICU used in this implementation is manufactured by Joseph Pollak of Boston, Mass. for Freightliner Corporation. The instrumentation control unit is available as a replacement part from Freightliner Corporation.

FIG. 4 is a diagram of one implementation of the keypad used with the ICU. The keypad includes a number of keys to enable the driver to query the ICU for information and to control its operation. The keypad shown in FIG. 4 includes the following dedicated keys:

1. Time (90)
2. Temperature (92)
3. Fuel (Fuel used, Avg. MPG) (94)
4. Trip (Miles, hours) (96)
5. Leg (Miles, hours) (98)

The dedicated keys are used to request specific information such as the current local time (time), the current temperature (temperature), fuel used, average miles per gallon, etc. The trip and leg keys are used to display the miles travelled and elapsed hours for a trip or a leg of a trip.

The keypad also includes the following general purpose keys:

1. Left Arrow Key (100)
2. Down Arrow Key (102)
3. Right Arrow Key (104)
4. Set/Reset Key (106)

These keys can be used to scroll through message screens on the display, enter data, clear messages, etc. For example, these keys can be used to enter configuration data such as a parameter representing the activating time for a stale air warning message. The activating time refers to the length of time the HVAC can remain in recirculation mode before the message system alerts the driver. When a warning message is displayed, a key or keys may be used to clear a warning message from the display.

Figure 6:
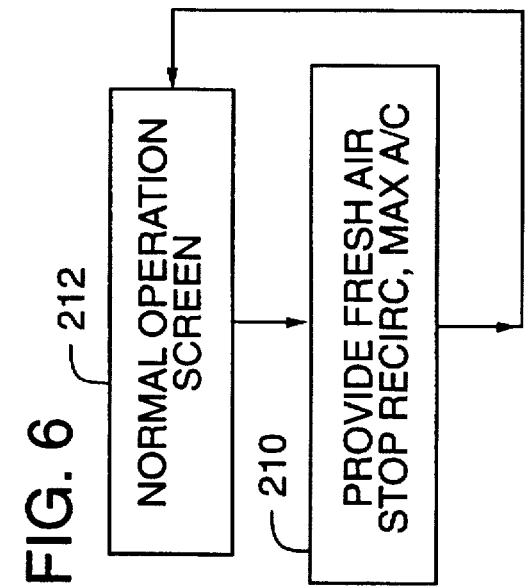
FIG. 6 is a diagram illustrating an implementation of a message display to alert the driver that the HVAC system has been in recirculation mode for a predefined time period.
Figure 5:
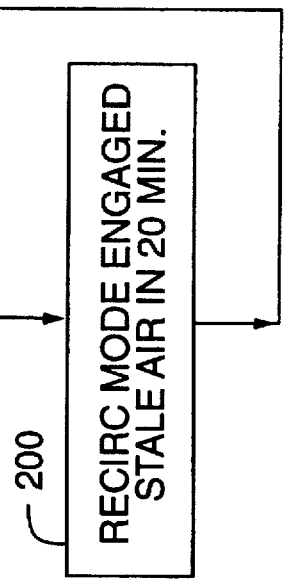
FIG. 5 is a diagram illustrating an implementation of a message display indicating that the HVAC system has been placed in recirculation mode.

In one implementation of the message system, the ICU displays a message when the HVAC systems enters recirculation mode, and displays an alert if the HVAC system remains in recirculation mode for a predetermined time. FIGS. 5 and 6 illustrate examples of these messages.

FIG. 5 is a diagram illustrating an example display message 200 to acknowledge that the system has entered recirculation mode. When the ICU receives a signal from the HVAC sensor indicating that the user selected recirculation mode, it enters a display routine to display this message. The message warns the driver that the air will become stale in a specified period of time, such as 20 minutes, for example.

The ICU displays this message and then returns to the normal operation screen 202. In this particular implementation, the normal operation screen 202 refers generally to the screen that the ICU was displaying when the ICU replaced it with the alert message. The specific information and format of the information displayed varies depending on the operating state of the vehicle and, more specifically, the inputs to the ICU. When the vehicle is in motion during normal operating conditions, the ICU displays fuel economy data and an odometer reading. During the ignition sequence, the ICU displays diagnostic information, and when the vehicle is stationary, the user can scroll through set-up screens and diagnostic information. While the ICU displays these types of display screens in this implementation, other alternative message screens may be displayed.

The ICU can display a message in a variety of different formats. In this implementation for example, the ICU can be configured to display a message in any of number of selected formats such as display message one time only for x seconds, display message for x seconds and repeat every y seconds (where x is an integer in a predefined range), display the message until any key is pressed, etc.

The ICU displays messages based on selected formats, which can be selected by setting display parameters in its configuration file. Each display message can have an associated display parameter or parameters that the ICU uses to control the display of the message. The value of the parameter indicates how the message will be displayed. A value of NULL or zero means that the message is disabled, a value of 1 means that the message is displayed once for 7 seconds, and a value of 2 means the message is displayed 7 seconds every 254 seconds. If the display parameter has been set to any number in the range from 3–253, the message is displayed until a user presses any key on the keypad. After the user presses the key, the message is repeated in the programmed time (3–253 seconds), and the cycle continues until the condition that caused the message is no longer satisfied. If the display parameter has been set to 254 (always on), then the warning message is displayed as long as the ICU detects the condition that initially caused the display of the warning message.

When the HVAC system enters the recirculation mode, the ICU enters a display routine to track the elapsed time while in recirculation mode. This routine controls the display of warning message if the elapsed reaches a predefined time called the "activating time." The activating time, in this example, corresponds to the time specified in the message 200 shown in FIG. 5 (20 minutes, for example).

As the ICU accumulates the elapsed time, it also continues to monitor the state of the recirculation mode. If the recirculation mode is no longer active, as indicated by the signal (or lack of signal) from the HVAC sensor, the ICU exits the routine and thus, ceases to accumulate elapsed time.

If the elapsed time reaches the activating time for the stale air alert, the ICU displays a warning message such as shown at 210 (FIG. 6) alerting the driver that the air may be getting stale.

FIG. 6 illustrates an example of a warning message 210 displayed when recirculation mode remains active for a predefined time. As shown, the message alerts the driver to turn off the recirculation mode. The ICU returns to the normal operation screen according to the selected display mode set for the message as described above. If the message is set to repeat or display the warning message persistently, the ICU continues to monitor the status of the recirculation mode and repeats the warning message or displays it persistently or continuously as long as the HVAC system remains in recirculation mode.

When the ICU detects that the recirculation mode is no longer active, it exits the display routine and ceases to repeat the warning message. The ICU returns the display to the normal operation screen 212.

The ICU can also trigger warning messages based on inputs from a $CO_2$ sensor. The warning message 210 in FIG. 6 is an example of possible format for a message alert generated in response to an input signal from the $CO_2$ sensor indicating that the $CO_2$ level in the cab has exceeded a threshold value.

When the ICU is equipped with the $CO_2$ sensor, the ICU can use the HVAC sensor as a supplement to evaluating air quality in the cab of the truck through the $CO_2$ sensor (FIG. 1 and FIG. 3). For instance, the ICU can display a warning message such as the one in FIG. 6 in both of the following 2 cases: 1) when the $CO_2$ level exceeds a threshold, as detected through the $CO_2$ sensor, and 2) when the ICU determines that the HVAC has been in recirculation mode for a predetermined period of time.

Alternatively, the ICU sensor can use the HVAC sensor as a back up to the $CO_2$ sensor in cases where it determines that the $CO_2$ sensor is malfunctioning. In this alternative approach, the ICU only monitors the HVAC sensor if it determines that the $CO_2$ is not functioning properly. For instance, the ICU can monitor the output signals from the $CO_2$ sensor to perform diagnostic error checking. If the ICU detects that the temperature is too high or out of range to make an accurate reading, or if the output signals are out of range, the ICU can then monitor only the HVAC sensor as long as the $CO_2$ sensor is not functioning properly.

The ICU can use other approaches as well. For example, the ICU can be programmed to display a warning message based on whichever condition ($CO_2$ level exceeded, or activating time in recirculation mode elapsed) occurs first. In this case, the ICU monitors the $CO_2$ sensor and HVAC sensors through their respective input signals. The ICU displays an alert message when it detects either of the conditions: 1) the $CO_2$ level exceeds a threshold or 2) the HVAC system has remained in recirculation mode for the activating time. The ICU may continue to display a warning message as long as either of these conditions remain active.

As an additional warning, the ICU can sound an audio alarm using an audio warning device such as the buzzer shown in FIG. 3 to alert the driver that it is displaying a message. To enable this feature in the ICU, a control parameter is set in the ICU's configuration file. When this control parameter is set for a particular display message and the conditions for the message are satisfied, the ICU sounds an audio warning in addition to displaying the message on the display device.

The CPU in the ICU can control the audio output of the buzzer to produce different types of audio warnings for different messages. For high priority warning messages such as the stale air warning, for example, the CPU instructs the buzzer to play a more prominent audio warning such as a continuous series of pulses or a continuous pulse tone. For lower priority messages such as when the HVAC system enters recirculation mode, the ICU plays a less prominent audio warning such as a limited number of pulsed tones. This feature enables the ICU to distinguish among different warning messages based on their importance.

Having described and illustrated the principles of our invention with reference to a preferred embodiment and several variations thereon, it should be apparent that the invention can be modified in arrangement and detail without departing from its principles. Accordingly, we claim all modifications as may come within the scope and spirit of the following claims.

We claim:

1. In a vehicle having a ventilation system with a recirculation mode, a message system for the vehicle comprising:
    a display device;
    an HVAC sensor operable to generate a signal indicating whether the ventilation system is in the recirculation mode;
    a control unit coupled to the HVAC sensor and the display device, the control unit being operable to receive the signal from the HVAC sensor, being operable to detect when the recirculation mode is active by monitoring the signal, and being operable to detect a first condition in which a predefined time period has elapsed while the HVAC system has been in the recirculation mode, and in response to detecting that the first condition is satisfied, being operable to generate the display of an alert message on the display device.

2. The system of claim 1 wherein the control unit is coupled to an audio warning device; and wherein the control unit is operable to instruct the audio warning device to play an alarm in response to detecting that the first condition is satisfied.

3. The system of claim 1 wherein the control unit is operable to display a message indicating that the recirculation mode is active in response to detecting that the HVAC system has been switched into recirculation mode.

4. The system of claim 3 wherein the control unit is coupled to an audio warning device; and wherein the control unit is operable to instruct the audio warning device to play a first alarm in response to detecting that the HVAC system has been switched into recirculation mode, and is operable to play a second alarm, different from the first alarm, in response to detecting that the first condition is satisfied.

5. The system of claim 1 further including a $CO_2$ sensor coupled to the control unit, the $CO_2$ sensor being operable to detect whether the level of $CO_2$ in the vehicle has exceeded a threshold, and in response to detecting that the level of $CO_2$ in the vehicle has exceeded the threshold, the $CO_2$ sensor being operable to generate an input signal to the control unit;

wherein the control unit is operable to receive the input signal and is operable to generate the display of an alert message in response to receiving the input signal from the $CO_2$ sensor.

6. The system of claim 1 wherein the control unit is operable to monitor the signal from the HVAC sensor after the predefined time period has elapsed, and is operable to repeat or persistently display the alert message as long as the HVAC system remains in recirculation mode.

7. In a truck with a cab and an HVAC system with a recirculation mode to recirculate air through the cab, a message display system comprising:

a $CO_2$ sensor operable to sense $CO_2$ level inside the cab and operable to generate a first signal indicating that the $CO_2$ level has reached a predefined threshold;

a HVAC sensor operable to generate a second signal indicating whether the HVAC system is in the recirculation mode;

an instrumentation control unit including a display device and an input device;

the instrumentation control unit being in communication with the $CO_2$ sensor to receive the first signal, the instrumentation control unit being operable to monitor the first signal from the $CO_2$ sensor to detect whether the $CO_2$ level in the cab has exceeded the predefined threshold, and being operable to generate a first warning message in response to receiving the first signal; and the instrumentation control unit also being in communication with the HVAC sensor to receive the second signal, the instrumentation control unit being operable to monitor the second signal from the HVAC sensor to detect whether the HVAC system is in recirculation mode, being operable to keep track of elapsed time when the recirculation mode is active, and being operable to generate a second warning message when the HVAC system has remained in recirculation mode for a predefined time.

8. In a cab of a truck having a ventilation system that recirculates air in the cab in a recirculation mode, a method for monitoring air quality and generating air quality messages, the method comprising:

monitoring a ventilation system control circuit to detect when the ventilation system is placed in the recirculation mode;

detecting when the ventilation system is placed in recirculation mode;

tracking the elapsed time that the ventilation system is in the recirculation mode; and when the elapsed time reaches or exceeds an activating time, displaying a stale air alert message in the cab of the truck.

9. The method of claim 8 further including:

displaying a message acknowledging that the recirculation mode is active in response to detecting that the ventilation system has been placed in the recirculation mode.

10. The method of claim 8 further including:

when the elapsed time reaches or exceeds an activating time, displaying the stale air alert message for a first predetermined time period and then replacing the stale alert message with a normal operation message;

after the elapsed time reaches the activating time, continuing to monitor the ventilation system control circuit; and repetitively displaying the stale air alert message at predetermined intervals as long as the ventilation system remains in the recirculation mode.

11. The method of claim 8 further including:

monitoring $CO_2$ level in the cab of the truck; and when the $CO_2$ level reaches a predefined limit, displaying an alert message.

12. The method of claim 10 further including:

monitoring a $CO_2$ level sensor;

in response to detecting that the $CO_2$ level sensor is malfunctioning, executing each of the steps in claim 8.

* * * * *